(No Model.)
W. A. REDDICK.
Shovel.
No. 230,337. Patented July 20, 1880.
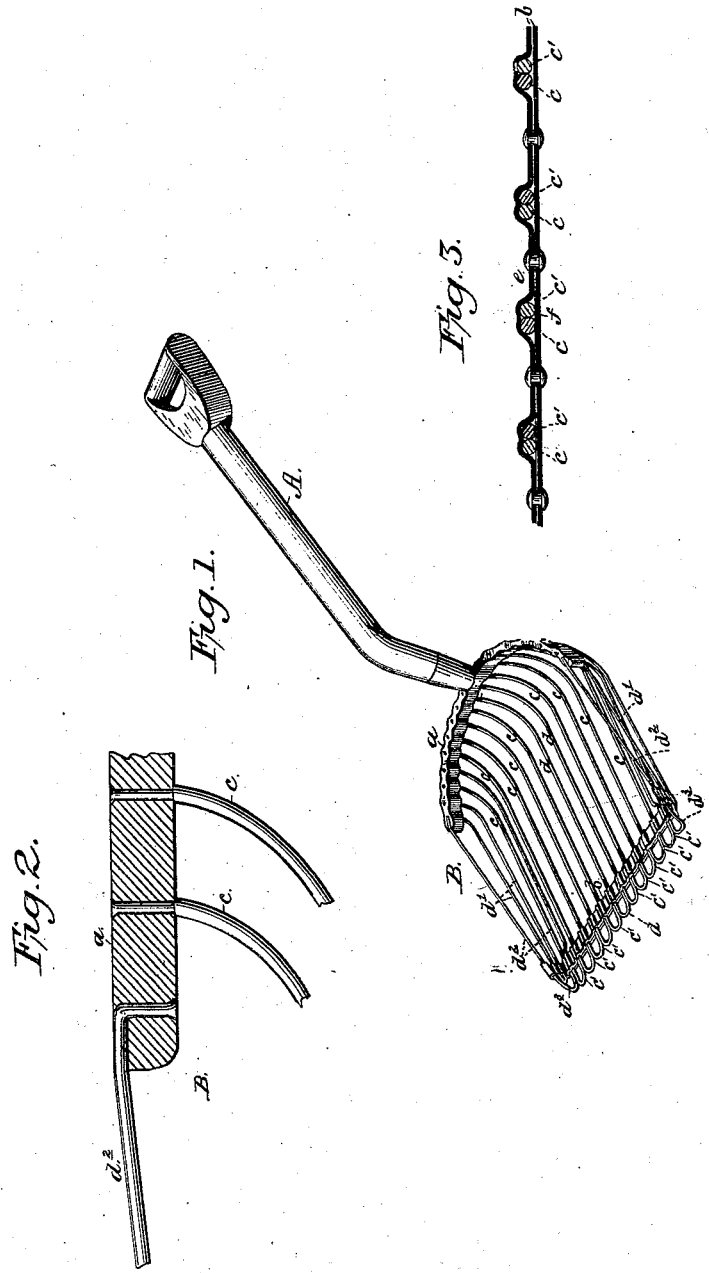
WITNESSES:
INVENTOR:
Wm. A. Reddick
BY
ATTORNEYS.

UNITED STATES PATENT OFFICE.

WILLIAM A. REDDICK, OF NILES, MICHIGAN.

SHOVEL.

SPECIFICATION forming part of Letters Patent No. 230,337, dated July 20, 1880.

Application filed March 2, 1880. (No model.)

*To all whom it may concern:*

Be it known that I, WILLIAM A. REDDICK, of Niles, in the county of Berrien and State of Michigan, have invented a new and Improved Shovel; and I do hereby declare that the following is a full, clear, and exact description of the same, reference being had to the accompanying drawings, forming part of this specification, in which—

Figure 1 is a perspective view of the shovel complete. Fig. 2 is an enlarged detail, showing mode of connecting the tines to the upper frame-bar. Fig. 3 is an enlarged section taken longitudinally through a portion of the cross-tie.

My invention relates to an improvement in shovels of that class which are formed of parallel open tines, for use in culling potatoes from the loose earth, screening coal, sifting ashes, and for other analogous purposes.

It relates more particularly to that form of shovel claimed in Patent No. 226,351, granted to me April 6, 1880, in which a set of parallel wires or tines are arranged in twin pairs, fixed at their upper ends in a socket-piece, and connected near their outer ends by a cross-tie, and which two wires of each pair are formed of one piece, and below the cross-tie are bent to form a loop, and are then returned parallel with each other to the socket-piece above, thus forming below the cross-tie a looped edge with intervening spaces. As these loops are liable to wear out, my invention consists, first, in increasing the number of loops, so that the edge is more nearly continuous, whereby an increased bulk of metal is made to resist the excessive abrasion to which the edge is subjected.

The improvement also consists in the arrangement of the wires forming the sides of the shovel in connection with the cross-tie, for the purpose of strengthening the cross-tie at its ends or points where it turns up to connect with the side wires, all as hereinafter more fully described.

In the drawings, A represents the handle, and B the scoop, of the shovel, which latter is formed of parallel wires, the upper ends of which are secured in a curved metal bar, $a$, the said bar being formed with sockets extending through the same, and the upper ends of the wires being shouldered and upset in said sockets, as shown in the enlarged sectional view in Fig. 2.

Near the outer ends of the wires or tines is permanently fixed a cross-tie, $b$, for the purpose of staying or bracing the outer ends of the tines against twisting or lateral displacement, as described and claimed in my patent referred to. In arranging the tines or wires, however, instead of making them in pairs or twin sections bent at the ends, so as to form loops, as in my prior application, I make the wires or tines $c$ separate, and, after bending their ends to form the edge of the shovel, I fix the short or would-be free end $c'$ in the cross-tie $b$, beside the next adjacent tine. This, it will be seen, preserves the rounded character of the edge, which adapts the shovel to be pushed among potatoes or vegetables without cutting them, and also secures a much stronger edge, with double the number of loops, and one that is better adapted to resist the increased wear at this point, the bulk and strength of metal below the cross-tie being just double that above it.

All of the tines $c$, it will be seen, may be made separate and single; but the two middle tines, $d$, and side tines, $d'$ $d^2$, may be made of twin sections, as shown.

For securing the ends of the tines any form of cross tie or brace which will properly space and hold the wires apart may be used; but, as shown, two strips, $e$ $f$, of strap-iron are riveted together between the wires, and made to inclose and hold the latter, as shown in Fig. 3.

In arranging the cross-tie with respect to the side wires or tines, $d'$ $d^2$, it will be seen that said cross-tie is bent up at its ends at an angle in order to connect with the side wires, and instead of returning the side wire, $d^2$, through the bent end of the cross-tie, I return it through the main straight portion of the cross-tie. By this arrangement the head $d^3$ acts as an angular brace to hold the sides and bottom of the shovel in proper relative position.

Having thus described my invention, what I claim as new is—

1. A shovel composed of parallel wires or tines connected by a cross-tie, and having below the cross-tie a double set of loops or bent ends, as and for the purpose described.

2. The combination, with a set of tines, $c$, and a cross-tie connecting the same near their outer ends and bent at its extremities, as described, of the side tines, $d^2$, extended through the bent ends of the cross-tie and returned through the straight or main portion of the said cross-tie to brace the sides of the shovel, as described.

The above specification of my invention signed by me this 1st day of March, 1880.

WILLIAM A. REDDICK.

Witnesses:
    EDWD. W. BYRN,
    CHAS. A. PETTIT.